Oct. 31, 1967  G. L. KOONS  3,349,819

SAW TABLE AND GUIDE

Filed Sept. 7, 1965

INVENTOR

GENE L. KOONS

BY William A. Stokes

ATTORNEY

United States Patent Office 3,349,819
Patented Oct. 31, 1967

3,349,819
SAW TABLE AND GUIDE
Gene L. Koons, 9424 Overlea Drive,
Rockville, Md. 20850
Filed Sept. 7, 1965, Ser. No. 485,169
3 Claims. (Cl. 143—174)

This invention relates to woodworking and more particularly to a combination saw table and guide.

For many years skilled woodworkers and craftsmen, as well as hobbyists have employed various types of combination saw tables and guide fences for guiding the work in a predetermined path relative to the cutting tool. These devices have heretofore primarily consisted of a single cross member parallel with, or perpendicular to, the movement of the work toward the saw and were ordinarily guided manually.

None of these prior devices have been entirely satisfactory in view of the several disadvantages which have arisen with their use however. One particular disadvantage has been that it has been difficult to maintain the work on its predetermined course so that the cutting action is accurate because of the manual guidance systems. This difficulty has been accented by reason of the human error associated with hand guiding.

Attempts have been made by some to remedy this condition by the use of what is commonly known as miter boxes or miter guides. However, this solution to the problem has proven generally unsatisfactory because of the prohibitive cost and complicated construction of such devices which have prevented their universal use.

Another disadvantage of the prior art guides is that they have been generally limited to guiding the work in a single direction such that the user is handicapped if he desires to perform both rip-sawing and cross-cutting operations with one device. Thus each guide could be utilized only as a rip fence or for cross-cutting, but not both.

A further disadavantage of saw guides known to the art has resided in their failure to incorporate safety features to prevent accidental injury to users. In using the guides, the workman's hands generally move very close to the cutter and severe injury has often resulted. This disadvantage has been especially acute where novices have attempted to use the saws, such as are found in high school industrial arts classes and the like.

In accordance with this invention a combination saw table and guide is provided which obviates these and other disadvantages present in the devices of the prior art.

The present invention provides a saw table and guide which has utility both as a fence or guide for cross-cutting work and as a rip fence for ripping and which is simply and inexpensively constructed as well as easy to operate and maintain.

It is accordingly one object of the present invention to provide a combination saw table and guide which is capable of moving the work against the cutter with precision and accuracy either in ripping or cross-cutting.

Another object of the present invention is to provide a device for guiding work against a cutter in a safe and efficient manner such that even a novice can correctly use power saws with greater safety and precision than has been known heretofore.

Other objects and advantages of this invention will become readily apparent from the following detailed description of the invention.

In accordance with this invention there is provided a combination saw table and guide construction comprising a table having slots parallel to the table disposed on two adjacent sides thereof, the slots being narrower at the top than at their base, and a sliding T-bar member, consisting of a first arm adapted to fit into and slide freely in either of said slots and a second arm secured to said first arm of said T-bar in a perpendicular manner intermediate the end portion thereof, said second arm extending across and being slidably secured to the opposite side of the table.

The various features and advantages of the invention will be apparent from the following detailed description which is shown by way of illustration in the accompanying drawings, wherein.

In accordance with the present invention, a device is presented which incorporates a unique saw table and guide system which is easily susceptible of use both as a cross-cutting guide and a rip fence. The device is particularly adapted for use by woodworking novices where safety in the work process is often one of the primary aims.

Figure 1:
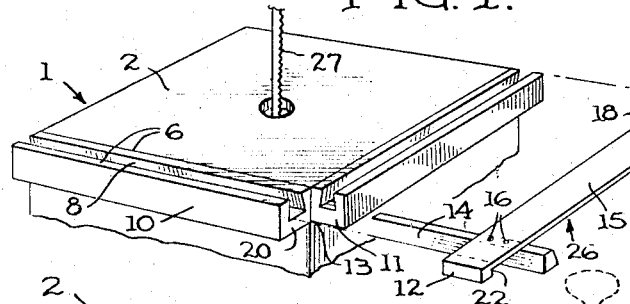
FIGURE 1 is a perspective view of the saw table and guide wherein a jig or band saw is employed as the cutter and wherein the sliding T-bar is shown in extended relation for cross-cutting action.

Referring now in detail to the several views of the invention in the accompanying drawings, where like numerals indicate like parts, it may be seen that the FIGURE 1 depicts a perspective view of the device of the invention showing the sliding guide in extended relation. In this figure, the numeral 1 depicts generally a saw table with attendant elements including a table top 2 and a jig or hand saw blade 27 disposed vertically in a table opening by conventional mounting means (not shown). The saw table top rests on a conventional base 5.

Disposed on adjacent sides or edges 5 and 6 of the saw table 1 are slots 7 and 8 parallel to the respective adjacent edges 3 and 6 of the saw table. In the embodiment shown, the slots are depicted as traversing the entire width and length of the table. However, it should be noted that the length of the slots will vary according to the needs of the user and the illustration is not to be considered as limiting.

The respective slots 7 and 8 are identical in structure and in the illustrated preferred embodiment, are constructed by channeling the slot in a single piece of wood indicated by numerals 9 and 10. In the drawings, slots 7 and 8 are shown as being of the "dovetailed" type, and while this is the preferred type of channel, it is contemplated that other channel types may be used. The only criticality involved is that the width of the slot at its top should be less than at its base, the reason for which will be apparent in the following description for using the device.

The slotted or channeled wood blocks are secured in a manner so as to be parallel to the edge of the table. Conventional means, such as by the use of screws, nails and the like are used to effect the securing operation. As the securing means are conventional, they are not shown in the drawings.

The slotted blocks 9 and 10 are secured to the table edge such that the adjacent ends 11 and 12 of the blocks form a right angle at their point of termination at corner 13 of the table. This is a necessary feature to permit the sliding guide to traverse the complete length of each slot as clearly shown in FIGURES 1 and 3.

The sliding guide or T-bar 26, adapted to be slidably secured in the slots, is composed of a first arm 14 and a second arm 15 disposed perpendicular to the first arm. Arm 14 is approximately the same shape as slots or channels 7 and 8 and is adapted to slide freely therein. The second arm 15 is a generally flat rectangular piece which is secured intermediate the end of the first arm by screws 16. It is understood that other securing means, such as nails, may of course be used.

Figures 3, 4:
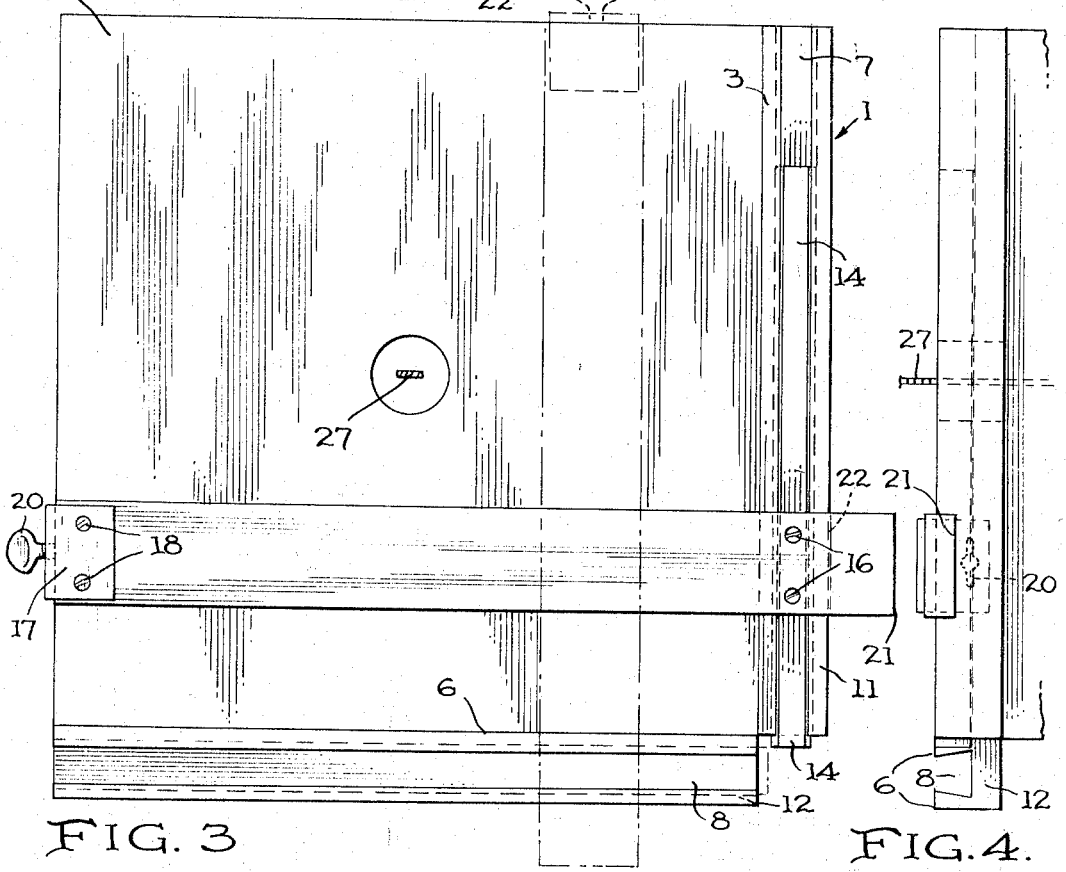
FIGURE 3 is a top plan view of the saw table and guide showing the T-bar in operative position for rip-sawing with the cross-cutting position shown in phantom.
FIGURE 4 is a partial side elevational view of the saw table and guide showing the cross-cutting position of the guides, and is a cross-sectional view of FIGURE 3 taken along lines 4—4.
Figure 5:
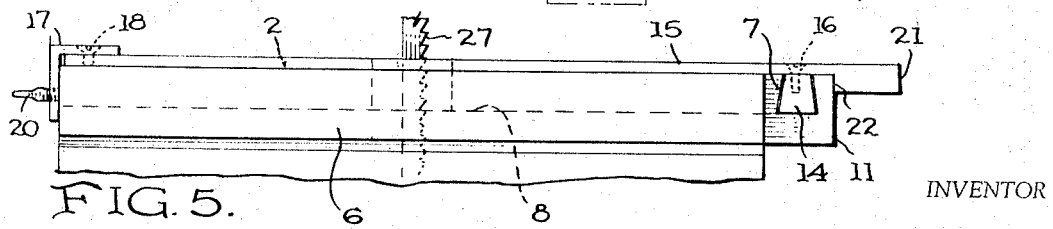
FIGURE 5 is a front elevational view of the guide taken along lines 5—5 of FIGURE 4 and representing the position of the sliding guide when used as a rip fence.

Arm 15 extends perpendicularly to arm 14 across the width of the saw table top 2 and terminates in end 17 which is secured to an adjustable clamp 19. The clamp 19, secured to the end of the arm 15 by screws 18, is adapted to slidably engage the edge of the table as seen in FIGURE 3. The clamp shown is of the adjustable screw type as screw 20 is adapted to be tightened to secure the arm to the table edge. Other types of adjustable clamps are considered adequate to secure arm 15 to the table edge.

In the embodiments shown in FIGURES 1 and 3, end 21 of arm 15 extends past arm 14 terminating in a cut-away portion or flange 22 which overlaps the slots in which the sliding arm 14 rests. It is clear that such extension is not critical to the basic operativeness of the invention. However, the use of the flanged construction is a safety feature in keeping parts of the body out of the slot so as to prevent pinched fingers and the like and also as a means for applying pressure against the T-bar when performing the sliding operation.

The operation of the invention is relatively simple. If the user desires to perform a cross-cutting operation and the saw is in the position shown in FIGURE 1, arm 14 is inserted into slot 8 on the edge of the table parallel with the saw blade 27. Arm 14 slidably engages slot or channel 8 until arm 15 rests on the table top 2 in a perpendicular manner to saw blade 27. Arm 15 extends across the table, as shown in phantom in FIGURE 3. Clamp 17, on edge 23 of the table, remains slightly loose so that it can slide along the edge of the table.

After the sliding T-bar is in position the wood desired to be cut is laid adjacent arm 15 and parallel thereto. The cutting action is then achieved by manually pushing the sliding bar forward into the saw blade 27 whereby the cutting action is achieved. The "dovetailed" slots which slidably engage arm 14 prevent straying of the sliding bar from the predetermined course as it necessarily follows the direction of the slot. Moreover, the fact that the slots are narrower at the top than at the base prevents the arm 14 from being lifted in any manner so as to cause accidents by slippage of the guide and work.

To use as a rip fence, the guide is removed from the slot 8, turned in the other direction and inserted in the same manner as for the first insertion. The guide is then pushed forward in slot 7 until the desired position adjacent the saw blade is reached, as in FIGURE 3, and then the clamp 17 is tightened. The tightening of the clamp 17 results in rigidly positioning arm 15 parallel to the saw blade 27. The work is then laid in a parallel manner adjacent to arm 15 such that one end thereof faces the cutting edge of the saw. When the ripping is performed, the work is slid so as to engage the saw with the arm 15 acting as the rip fence. As the T-bar is secured on end 18 by the adjustable clamp 15 and on end 21 by secured arm 14, the fence formed thereby causes the work to travel in an accurate, predetermined path. Thus the ripping operation is performed accurately and safely.

After the operation is completed, the clamp may be loosened and the guide device moved to a different position for further cross-cutting or ripping operations.

Figure 2:
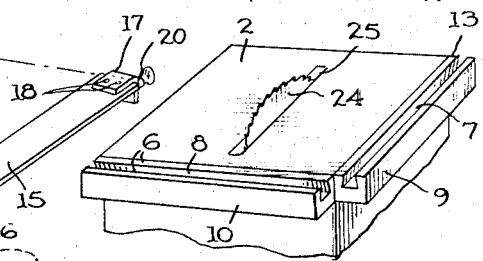
FIGURE 2 is a perspective view of the saw table in combination with a circular saw as the cutting element and showing the disposition of the adjacent slots without the T-bar guide.

This preferred embodiment of the invention has been described primarily with reference to the use of a jig or band saw. However, it is contemplated that the device is also operative with other types of saws. FIGURE 2, for example, shows a saw table with a circular saw 24 disposed in an opening 25 therefor. Receiving slots or channels 7 and 8 in wood blocks 9 and 10 are shown disposed at right angles on adjacent edges, as in the embodiment of FIGURE 1. While the sliding T-bar is not illustrated in FIGURE 3, the operation is exactly the same and therefore the type of saw utilized with the device may vary with the needs of the user.

It is clear that many variations of the present invention will become obvious to those skilled in the woodworking art; however, it is contemplated that all such obvious variations be included within the scope of the present invention. Such variations include the shape of the slots, the various securing means and relative positioning of the first and second arms to each other.

A basic variation of the device may result in conversion of the slidable T-bar guide to a mitering device. This may be accomplished by providing means for pivoting arm 15 at its crossing of arm 14 such as by use of a wingnut passing through slots in both arms. This would permit arm 15 to be disposed at angles other than merely perpendicular to arm 14 and thereby permit the wood to be ripped or cross-cut at the desired angle.

While specific details of construction have been referred to in describing the preferred embodiments of the present invention, it is understood that the invention is to be limited only by the following appended claims.

I claim:
1. A saw table and work guide combination for cross-cutting and ripping operations comprising a saw table having channels disposed on two adjacent sides thereof, each of said channels being parallel to the table edge, a slidable T-bar member consisting of a first arm adapted to engage either of said channels, and a second arm secured perpendicularly to said first arm intermediate the end portion thereof, said second arm extending across said table and engaging the opposite side thereof.

2. A cross-cutting guide and a rip fence comprising a saw table having channeled wood blocks disposed in a parallel manner on two adjacent edges of said saw table, a T-bar member consisting of a first arm adapted to engage said channel and a second arm secured perpendicularly to said first arm intermediate one end thereof, said second arm extending across said table and being secured to the opposite edge thereof, said channels being narrower at their top portion than at their base.

3. A cross-cutting guide and rip fence comprising a saw table having dovetail channeled wood blocks disposed in a parallel manner on adjacent edges thereof, a work guiding member adapted to be disposed on said table comprising a T-bar member consisting of a first arm adapted to slidably engage either of said dovetailed slots and a second arm secured perpendicularly to said first arm and intermediate one end portion thereof, said second arm extending across said table and adapted with clamping means to be secured to the opposite edge of said table.

References Cited

UNITED STATES PATENTS

| | | | |
|---|---|---|---|
| 2,808,084 | 10/1957 | Eschenburg et al. | |
| 2,822,834 | 2/1958 | Hammers | 143—174 X |
| 3,090,615 | 5/1963 | May | 143—174 X |

FOREIGN PATENTS

| | | |
|---|---|---|
| 1,183,226 | 12/1964 | Germany. |

WILLIAM W. DYER, Jr., *Primary Examiner.*

W. D. BRAY, *Assistant Examiner.*